Aug. 27, 1935.    H. M. WHEELER    2,012,648
FLORIST'S SHEARS
Original Filed June 10, 1933
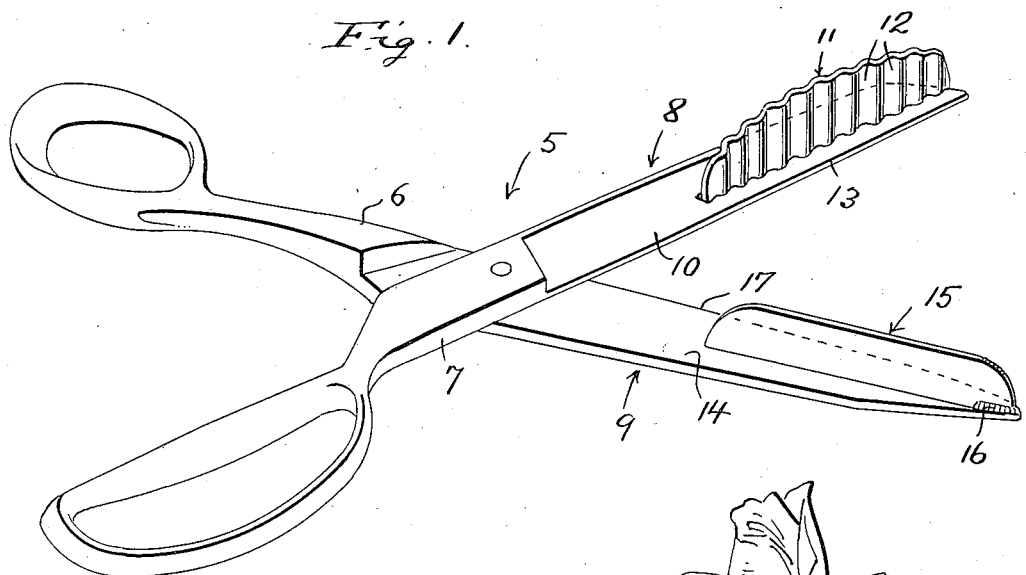
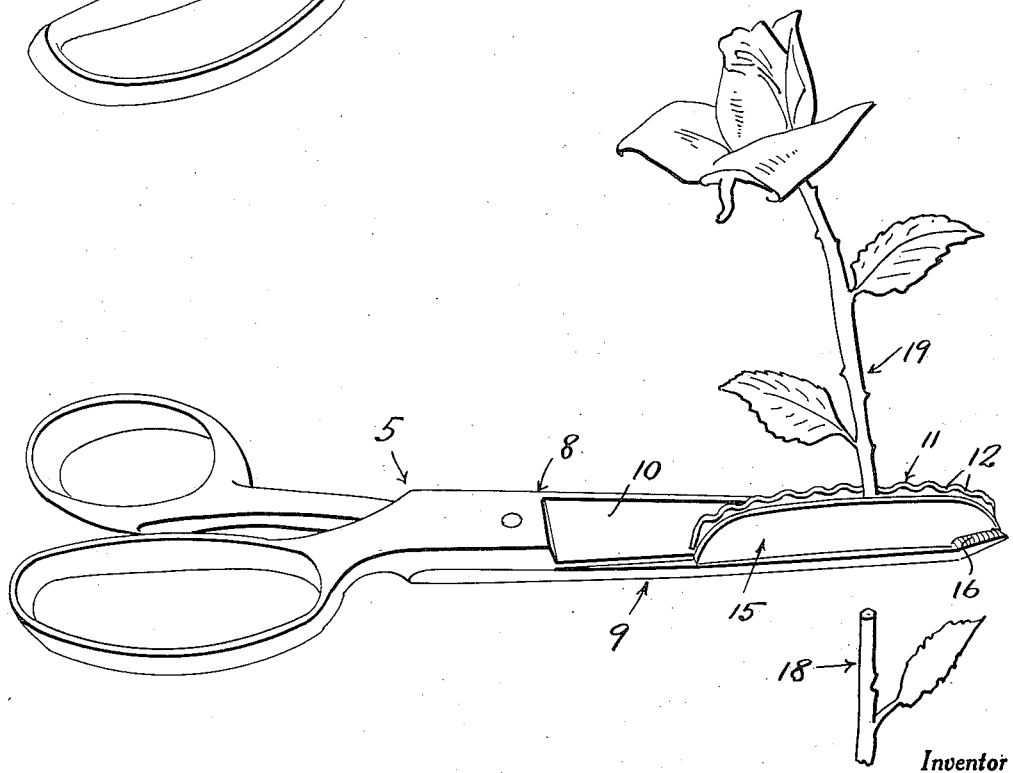
Inventor
Howard Murwin Wheeler
By Clarence A. O'Brien
Attorney Patented Aug. 27, 1935

2,012,648

UNITED STATES PATENT OFFICE 2,012,648

FLORIST'S SHEARS

Howard Murwin Wheeler, Iron River, Mich.

Application June 10, 1933, Serial No. 675,313
Renewed May 23, 1935

1 Claim. (Cl. 30—24)

My invention relates generally to scissors and shears, and particularly to a florist's shears embodying mean to hold the stem or stems of plants as they are cut by the shears, whereby the stems become connected to the shears so that they will not drop as a consequence of being severed from the plants.

It is an important object of my invention to provide a shears of the type described which embodies means which clamps the stem simultaneously with the severing thereof from the plant, so that the cutting of flowers from their plant and the carrying thereof to the place of deposit may be accomplished with one instead of two hands.

It is also an important object of my invention to provide a shears of the character described above which enables the florist to reach farther over a flower bed and to cut a greater number of flowers within a given time with less injury to the flowers through handling and dropping.

It is also an important object of my invention to provide a shears of the character described above and which will operate successfully to cut and carry flower stems whether the stems be upright or lying down or at some angle between the vertical and the horizontal when approached.

Further objects and advantages of my invention will be apparent from a reading of the following description in connection with the drawing, wherein for purposes of illustration I have shown a preferred embodiment of my invention.

In the drawing:

Figure 1 is a perspective view of the shears open.

Figure 2 is a perspective view of the shears closed after having severed the flower and its stem from the plant, the flower stem being shown connected to the shears.

Referring in detail to the drawing, the numeral 5 generally designates the shears which comprises the usual handled crossed levers 6, 7 provided with the blades 8, 9.

On the angulated outer surface 10 of the blade 8 I mount a spring metal member 11 which is semi-elliptical in form and transversely indented to provide the vertical corrugations 12 extending throughout its length. The member 11 is secured by soldering or by any suitable means to the angulated surface of the blade 8 at a uniform distance back of the edge 13. The member 11 is placed sufficiently back of the edge 13 to permit the stem to be completely severed before the member 11 may come into action, although as a practical matter the severing and the engagement of the member 11 with the flower stem is practically simultaneous, that is, the difference in incidence is so small as not to affect the position of the flower stem relative to the shears. On the flat surface 14 of the blade 9 is a member 15 of generally semi-elliptical form which is perpendicularly erected above the surface 14 and connected thereto by welding or soldering 16 located at the tip of the blade. The member 15 is of spring material and the manner of its connection with the blade 9 enables it to bend and flex and rock about the point of its connection when contacted by a flower stem pushed into engagement with it by the corrugated member 11, as the shear blades are brought together and overlapped in the cutting relation illustrated in Figure 2. The member 15 is located back of the cutting edge 17 approximately the same distance as the member 11 is located back of the cutting edge 13 of the blade 8, but it is to be understood that the exact position of the members 11 and 15 with respect to the cutting edges of the blades on which they are located is to be adjusted to suit the particular work in which the shears is to be employed, the matter of distance from the members to the cutting edges of their blades being determined to a certain degree by the thickness of the stems to be operated upon.

It is thought to be obvious that when the blades 8 and 9 come together on opposite sides of a stem or stalk 18 and into the stalk in the act of cutting therethrough, that the member 11 will engage the side of the flower stem 19 and cause the flower stem to settle into one of the grooves provided by the corrugations 12, at the same time bearing the opposite side of the flower stem 19 against the smooth face of the member 15, so that the flower stem is clamped between the members 11 and 15 and held at right angles to the shear blades. The member 15 will be deflected a certain amount so that its spring flexing character will be brought into action for clamping yieldably the flower stem. It is obvious that a thicker stem will cause a greater deflection of the member 15 than a relatively thinner stem.

It will be obvious that a florist may reach out with one hand a greater distance than he can reach out with both hands, and that by reason of this fact he is enabled by the use of the device of the invention to reach and cut flowers at a greater distance, and without risk of overhandling the cut flower or of dropping the same, since he may reach and cut and carry, that is bring back a cut flower or flowers without further effort than to reach out and manipulate the shears of the invention in the manner of an ordinary shears, as described.

Although I have shown and described herein a preferred embodiment of my invention, it is to be definitely understood that I do not desire to limit the application of the invention thereto, and any change or changes may be made in material, construction and arrangement of parts, within the spirit of the invention and the scope of the subjoined claim.

Having thus described my invention, what I claim as new is:—

The combination with a pair of shears, an elongated member corrugated transversely and having one side edge straight and fastened throughout its length to the outer face of one of the blades of the shears, the outer end of the member being located adjacent the end of the blade, a second elongated member of spring material having one of its side edges straight and contacting the inner face of the other blade, with the outer end of said edge fastened to the outer end of said blade, whereby the inner end of said member is adapted to swing toward the unsharpened end of said blade when pressure is exerted on the inner face of the member, both members being slightly spaced from the outer edges of the blade and the two members being substantially parallel to each other when the blades are in substantially closed position.

HOWARD M. WHEELER.